Aug. 24, 1948.  O. C. GOTSCHALL  2,447,697
RADIATOR CONNECTION HOSE
Filed Oct. 23, 1944
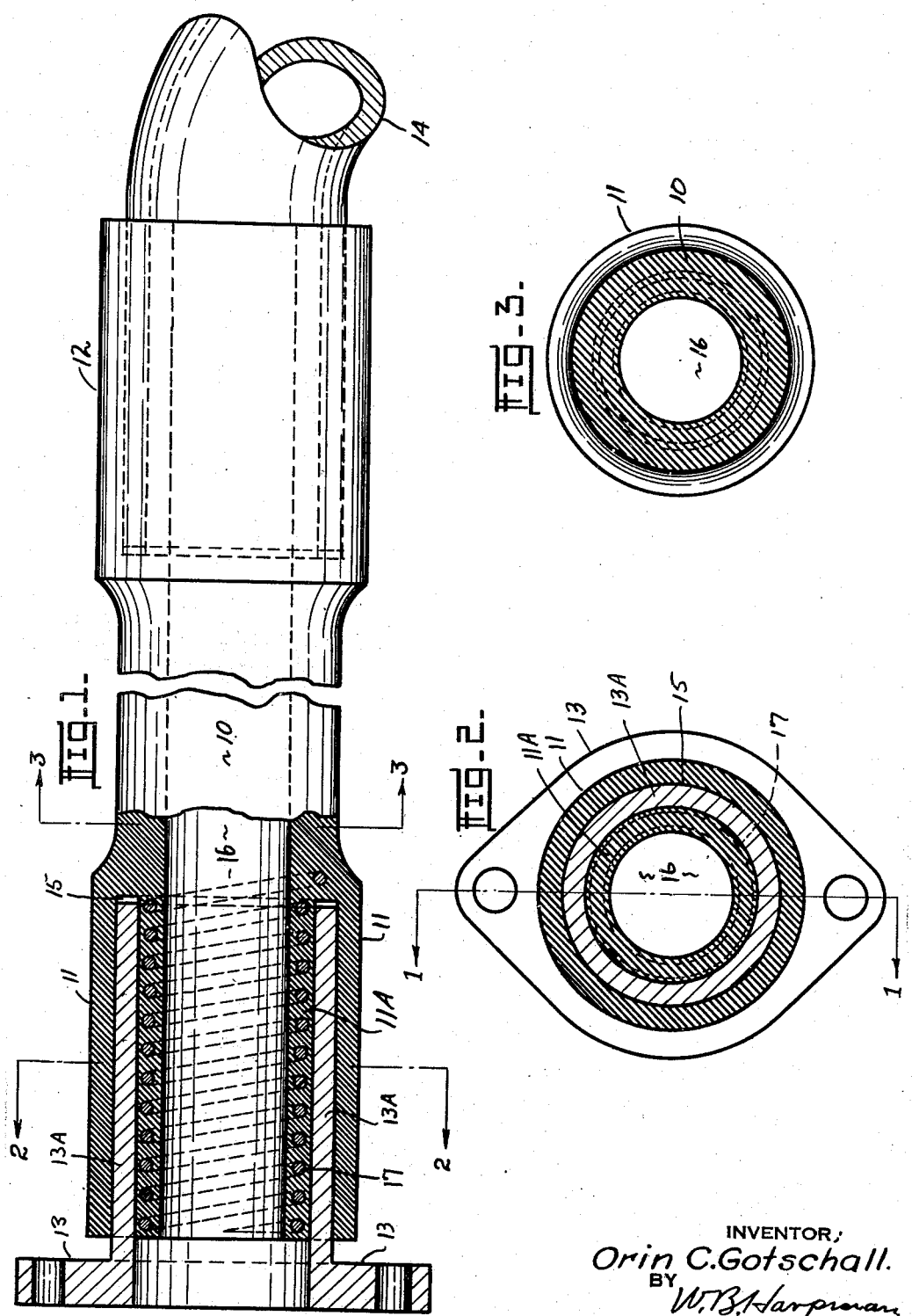
INVENTOR;
Orin C. Gotschall.
BY
W. B. Harpman
ATTORNEY Patented Aug. 24, 1948

2,447,697

UNITED STATES PATENT OFFICE 2,447,697

RADIATOR CONNECTION HOSE

Orin C. Gotschall, near Salem, Ohio

Application October 23, 1944, Serial No. 559,985

2 Claims. (Cl. 138—56)

This invention relates to a radiator connection hose such as is commonly employed in connecting a liquid cooled, internal combustion engine with a suitable radiator.

The principle object of the invention is the provision of a connection hose adapted for use in connecting a radiator with an internal combustion engine.

A further object of the invention is the provision of a connection hose incorporating a leak proof design facilitating the establishment of a tubular connection between the radiator and internal combustion engine.

A still further object of the invention is the provision of a connection hose incorporating means for preventing collapse of portions of the end structures thereof.

A still further object of the invention is the provision of a connection hose, the ends of which are formed with annular sockets for the reception of appropriately shaped portions of a radiator and internal combustion engine.

The connection hose shown and described herein has been designed to eliminate a majority of the difficulties commonly encountered in attempting to establish water-tight and flexible connections between radiators and internal combustion engines. It is well known that liquid cooled internal combustion engines must of necessity be operated in conjunction with a radiator structure to dissipate heat generated in the engine. It is also well known that it is common practice to mount the radiator structure more or less solidly on the frame of a motor vehicle and at the same time provide for the flexible mounting of the internal combustion engine. This results in the tendency of an ordinary radiator connection hose toward loosening and hence becoming unable to retain the liquid normally flowing therethrough. The present invention contemplates the provision of a radiator connection hose which provides, in effect, dual end structures engaging both the interior and the exterior of the radiator and engine connections and thereby eliminating the possibility of leakage at these points.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts in cross section and parts broken away and illustrates the connection hose establishing connection between a fitting, normally part of a radiator, and a tubular connection, normally part of an internal combustion engine.

Figure 2 is a cross sectional elevation taken on lines 2—2 of Figure 1.

Figure 3 is a cross sectional elevation taken on lines 3—3 of Figure 1.

By referring to the drawings and Figure 1 in particular, it will be observed that a radiator connection hose 10 provided with similarly formed end structures 11 and 12 has been disclosed in connection with a radiator fitting 13 and a tubular connection member 14 of an internal combustion engine. The radiator connection end 11 of the connection hose 10 is illustrated in cross sectional detail so as to disclose the design thereof which makes possible the achievement of the several objects of this invention. By referring to the right hand portion of Figure 1 it will be seen that the end 11 of the connection hose 10 is formed with an increased diameter so as to provide for the formation in this thickened end structure 11 of an axially, deep extending, annular socket 15. This axially extending, deep annular socket 15 provides for the reception of a tubular section 13A of the radiator fitting 13.

By referring now to Figure 2 of the drawings, which illustration comprises a cross section taken on lines 2—2 of Figure 1, it will be seen that the end structure 11 of the connection hose 10, by reason of the formation of the deep annular socket 15 therein, in effect forms a pair of tubular extensions, one on the exterior of the tubular portion 13A of the radiator connection 13 and one on the interior thereof, the section on the interior thereof being indicated by the numeral 11A. The tubular interior of the connection hose 10 continues unchanged in size through the interior of the member 11A and thereby establishes a fluid passageway 16 therethrough. In order that this interiorly positioned member 11A may be effective in insuring against the leakage of the fluid contents of the connection hose it is provided with a reinforcing member preferably a spirally positioned spring such as illustrated in Figure 1 and indicated by the numeral 17. This construction results in the continuous satisfactory frictional engagement of the member 11A against the interior of the tubular portion 13A of the radiator fitting 13 and at the same time insures against the collapse of this portion of the connection hose. The exteriorly positioned portion of the end 11 which is indicated by the numeral 11 in Figures 1 and 2 fits over the tubular portion 13A of the radiator fitting 13 in a conventional manner and conventional clamps (not shown) are employed thereover to retain the same in position thereon.

It will thus be seen that two separate and distinct water tight joints are thereby established between the connection hose 10 and the radiator fitting 13 and its tubular member 13A, neither one of which is as effective as the constructions heretofore known in the art. Taken together they constitute the improvement set forth in this disclosure and insure against the leakage of the fluid contents of the cooling system of any radiator and engine they may be used in connection with.

By referring now to Figure 3 a cross sectional illustration taken through the center section of the connection hose 10 may be seen and it will be observed that the enlarged end section 11 is shown as well as the cross sectional formation of the center section of the radiator connection hose 10.

It will thus be seen that an efficient and practical connection hose has been disclosed which will effectively provide a leakproof, flexible connection between an internal combustion engine and a radiator due primarily to the dual engagements of the end sections of the connection hose with the radiator and engine fittings.

Having thus described my invention, what I claim is:

1. A connection hose comprising a flexible tubular member of rubber like material having axially extending dual end sections of uniform thickness formed thereon, one inside of the other and spaced apart sufficiently to receive a standard tubular fitting, structural members embedded in said inner sections to lend shape retaining characteristics thereto, said structural members comprising spirally formed springs.

2. In a connection hose formed of rubber like material, end sections having spaced inner and outer axially extending tubular extensions, the inner sections lying within the area defined by the outer sections, and spirally formed spring members embedded in the said inner sections to impart shape retaining characteristics thereto.

ORIN C. GOTSCHALL.

REFERENCES CITED

The following references are of record in the file of this patent:

UNITED STATES PATENTS

| Number | Name | Date |
|---|---|---|
| 568,870 | Nicholls | Oct. 6, 1896 |
| 1,044,962 | Witzenmann | Nov. 19, 1912 |
| 1,385,821 | Goodall | July 26, 1921 |
| 1,394,300 | Gammeter | Oct. 18, 1921 |
| 1,630,895 | Herbst | May 31, 1927 |
| 1,847,218 | Lamb | Mar. 1, 1932 |
| 1,911,570 | Holstein | May 30, 1933 |
| 2,122,126 | Barnard | June 28, 1938 |
| 2,219,047 | Maclachlan | Oct. 22, 1940 |
| 2,277,397 | Graham | Mar. 24, 1942 |

FOREIGN PATENTS

| Number | Country | Date |
|---|---|---|
| 21,773 | Great Britain | Oct. 30, 1914 |
| 114,806 | Great Britain | Apr. 18, 1918 |